United States Patent [19]

Sudler

[11] 4,206,377

[45] Jun. 3, 1980

[54] SINGLE PHASE STEPPING MOTOR

[75] Inventor: Roland Sudler, Frankfurt am Main, Fed. Rep. of Germany

[73] Assignee: Quarz-Zeit AG, Frankfurt am Main, Fed. Rep. of Germany

[21] Appl. No.: 876,257

[22] Filed: Feb. 9, 1978

[30] Foreign Application Priority Data

Feb. 17, 1977 [DE] Fed. Rep. of Germany ....... 2706650
Jul. 30, 1977 [DE] Fed. Rep. of Germany ....... 2734444

[51] Int. Cl.² .......................................... H02K 37/17
[52] U.S. Cl. ................................. 310/49 R; 310/163; 310/154; 310/156
[58] Field of Search .......... 310/49, 156, 268, 162–165, 310/154

[56] References Cited

U.S. PATENT DOCUMENTS 3,878,414  4/1975  Harakawa ..................... 310/162 X
3,900,749  8/1975  Carriker ........................ 310/156
4,103,191  7/1978  Kawamura et al. ............ 310/49

*Primary Examiner*—Donovan F. Duggan
*Attorney, Agent, or Firm*—Martin A. Farber

[57] ABSTRACT

A single phase stepping motor, particularly for clocks, with a disc-like, axially magnetized rotor with a number of poles and a stator, the latter being made of two stator parts connected with one another via a bridge part, the latter carrying the excitation winding, of which each stator part on its free end passes into a smaller number (in comparison to half of the rotor pole number) of main poles, the main poles being directed towards the face side of the rotor, at least a part of the main poles being provided with auxiliary poles. Both stator parts lie in a first plane at least in the region of the stator poles, and the rotor is arranged in a second plane parallel thereto. A return disc is disposed on a face side of the rotor, which faces away from the stator poles.

15 Claims, 4 Drawing Figures

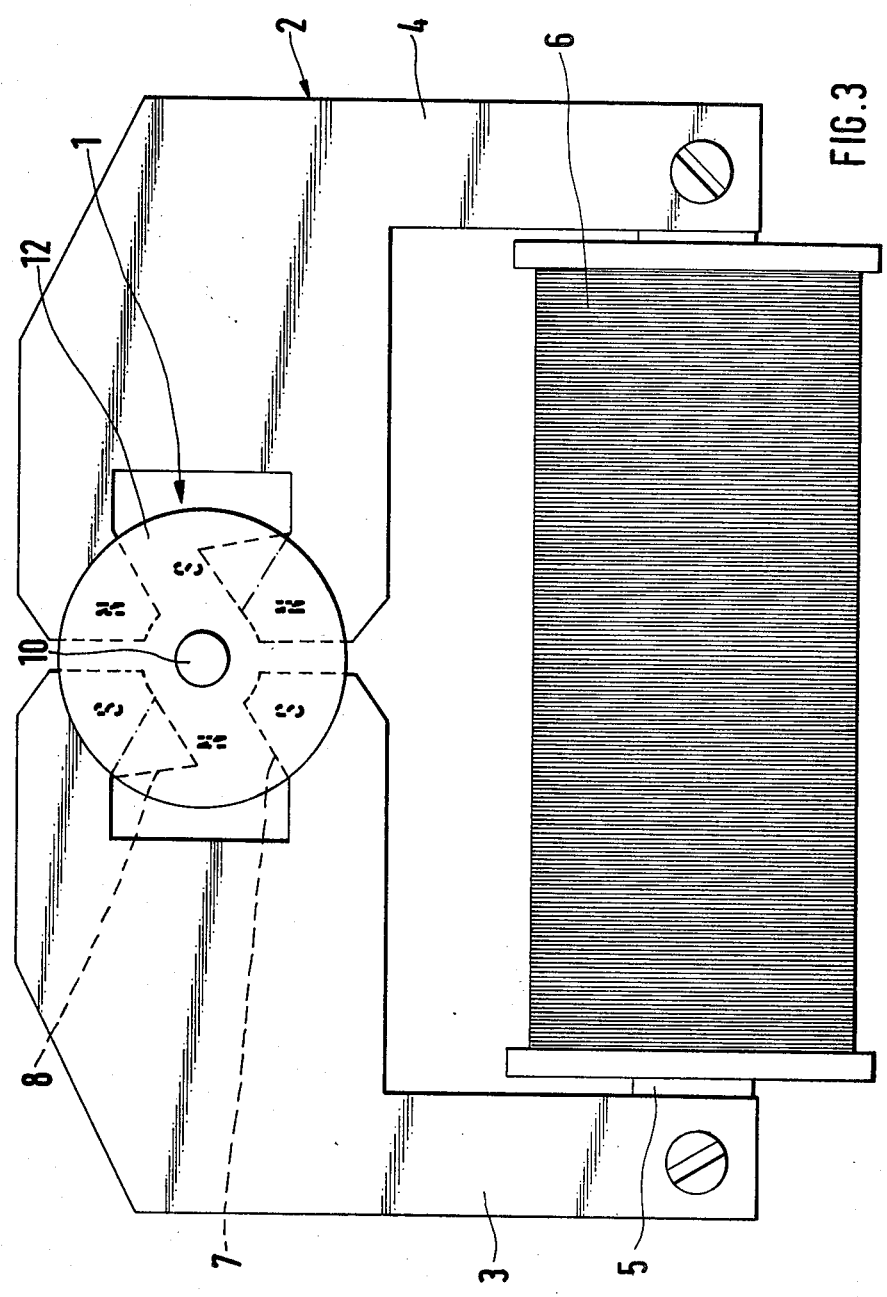

SINGLE PHASE STEPPING MOTOR

The invention relates to a single phase stepping motor, particularly for clocks, with a disc-like, axially magnetized rotor with a number of poles and a stator, the latter being made of two stator parts connected with one another via a bridge part, the latter carrying the excitation winding, of which each stator part on its free end transfers into a smaller number (in comparison to half of the rotor pole number) of main poles, the main poles being directed toward the face side of the rotor, at least a part of the main poles being provided with auxiliary poles.

One phase stepping motors of this type are already known, by which on the two stator parts, which comprise a high permeable material, there are arranged respectively pole pieces made of pure iron. In the circumferential direction the pole pieces have different heights or levels, whereby main poles and auxiliary poles are formed. The rotor comprises a disc made of a platinum-cobalt alloy with an even number of teeth, which respectively are magnetized in the axial direction. The rotor disc rotates between the pole pieces, which pole pieces project from the stator parts towards the face surfaces of the rotor disc. Such type of single phase stepping motors have the advantage that on the basis of the comparatively small air gap between the poles which are axially opposite one another, they have a very small energy consumption and a very high efficiency with small construction volumes.

It is an object of the present invention to further improve these single phase stepping motors with respect to their energy consumption, their efficiency and their construction volumes.

This object is aided in accordance with another object of the invention in the manner that both stator parts (3,4) lie in a first plane (A) at least in the region of the stator poles (7, 8), and the rotor (1) is arranged in a second plane (B) parallel thereto, a return disc (12) being provided on a face side of the rotor, which face side faces away from the stator poles (7, 8).

By these measures the construction height or level of the motor is substantially reduced compared to that of the known single phase stepping motors. If in addition the stator parts (3, 4) with their associated main- and auxiliary- poles (7, 8) each are constructed as an integral unit made of sheet metal then the construction height or level can be reduced to an optimum small measure or dimension. Simultaneously in this manner the air gap is considerably reduced so that the efficiency is at a substantially higher value and the energy consumption is at a substantially lower value than those values of the known single phase stepping motors. A particular advantage of the motor in accordance with the present invention resides in that the stator parts with the main poles and auxiliary poles can be produced considerably simpler and more favorable in cost than the corresponding parts of the known motors. In particular the possibility exists to be able to stamp-out complete stator parts in a single operation from a sheet metal.

It has proven suitable to form each main pole (7) as a finger tapering toward the rotor axle (10). With such main poles a more advantageous field distribution may be achieved over the rotor than would be the case with rectangularly-shaped main poles. Moreover it has proven advantageous to form each auxiliary pole (8) as a triangularly-shaped part, which part is attached or formed on a lengthwise or longitudinal edge of the main pole. Such an embodiment, in comparison to other likewise possible embodiment forms by which for example the auxiliary poles are formed by tabs which are angled-off from the main poles, has the advantage that a particularly compact construction is achieved with a smallest possible air gap, which has positive results in efficiency and energy consumption of the motor. Moreover the punching or stamping tools or dies for such an embodiment have a construction which is more favorable in production than that for the other embodiments.

According to an advantageous embodiment of the invention the free ends of the main pole are constructed to receive and mount therein a bearing for the rotor shaft (10). This permits, without particular difficulties, an exact alignment of the two stator parts relative to each other, which brings about advantages in efficiency and in the energy consumption. Beyond that such a measure possesses functional efficiency or technical production advantages.

A further increase in the efficiency may be achieved in the manner that the stator parts (3, 4) are made of a soft magnetic material (or low retentive material) of low coercive force or retentivity. With the materials, known under the trade names Hyperm, Hyperm 766, Hyperm 800, Hyperm 900 and Hyperm Max., advantageous results could be achieved. These materials are deformable or workable cold so that the stator parts with the main- and auxiliary- poles can be stamped out.

A further positive influence on the efficiency and the energy consumption of the motor may be achieved in the manner that the rotor comprises a synthetic material or plastic bonded permanent magnet made of a lanthanide-ferromagnetic alloy. With such types of alloys particularly high energy products (BH) max. may be attained. It has proven particularly advantageous to provide a lanthanide-cobalt alloy as a permanent magnet material, since this in the previous specified alloy group has a particularly favorable (BH) max. value. Still a samarium-cobalt alloy is advantageous, which possesses a maximum energy product of the order or magnitude of 120 kJ/m$^3$.

A further reduction of the energy consumption of the motor can be achieved by the use of a rotor with the highest possible number of poles. Namely, the higher the number of the rotor poles, the smaller the angle of rotation of each step and the lower can the energy content of the individual control pulses be chosen. It has proven particularly advantageous to construct the rotor 60 polar and the stator 30 polar. A motor with such a rotor not only has a most extremely low energy consumption, but beyond that also still has the advantage that since the rotor rotates with a second step, the rotor shaft can be used directly as a seconds shaft. On the basis of functional efficiency it can be suitable to form the rotor 60 polar and the stator 10 polar, since with a higher polar stator, the formation of the individual main- and auxiliary- poles can lead to certain difficulties. On the same basis in general only a portion of the main poles are provided with auxiliary poles, whereby it is to be considered that with a reduction of the number of the auxiliary poles the motor starting torque also decreases.

It is known to be indispensible for many purposes of use to provide a damping or attenuation device by which the over-swinging or overshooting of the rotor is damped after a step. Such a damping device however leads to an unwanted enlargement in the construction volume of the single phase stepping motor. According to a further concept of the invention this disadvantage can be circumvented in the manner that the return disc (12) is mounted floating or suspended on the rotor shaft (10) (i.e., partially mounted fixed to and partially free on the shaft, such that the disc can rotate jointly with, or relative to, the rotor shaft depending on the action of the shaft). By such a type of formation of the single phase stepping motor, the return disc additionally is used as an inertia mass, which mass is magnetically coupled with the rotor. This coupling acts such that after the end of a step the return disc continues to turn, while the rotor begins to slacken or rotate back. By means of the attraction of both parts thereby there arises a braking or slowing down of the rotational movement of both parts and consequently the desired damping. Particularly favorable damping values may be attained when a narrow air gap exists between the rotor (1) and the return disc (12), since then a soft coupling arises between the parts.

With the above and other objects and advantages in view, the present invention will become more clearly understood in connection with the following detailed description of preferred embodiments, when considered with the accompanying drawings, of which:

FIG. 3 is a plan view of another single phase stepping motor with a four pole stator and an six pole rotor;

each in substantially enlarged illustration.

Figure 1:
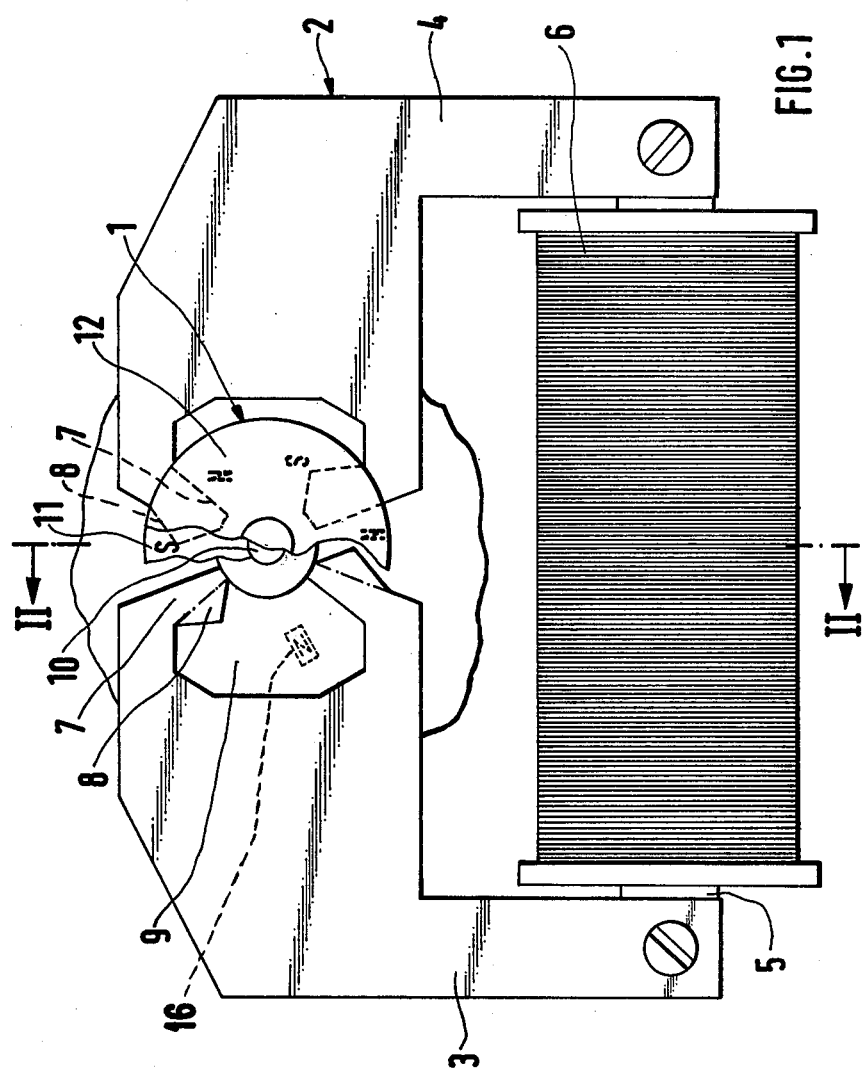
FIG. 1 is a plan view of a single phase stepping motor with a four polar stator and a six polar rotor.
Figure 2:
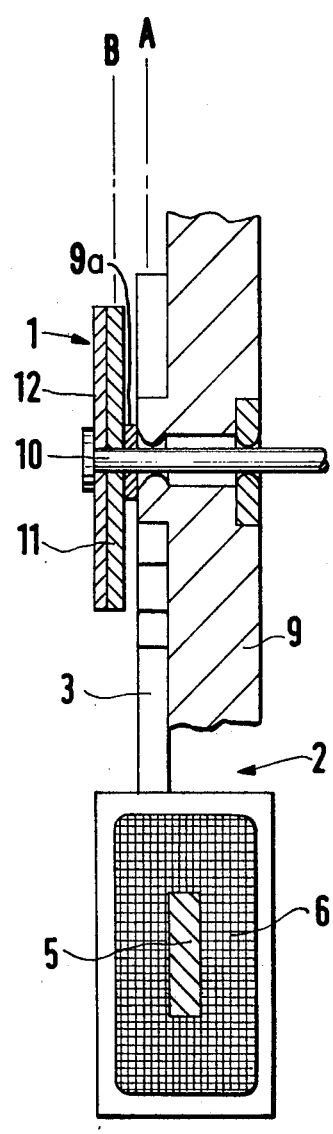
FIG. 2 is a longitudinal section through the single phase stepping motor according to FIG. 1, taken along the lines II—II.

Referring now to the drawings, and particularly to FIGS. 1 and 2, a single phase stepping motor in accordance with the present invention comprises a six polar rotor 1 and a stator 2, the latter comprising two stator parts 3 and 4 as well as a bridge part 5 connecting these two parts with the excitation coil 6.

Both stator part 3 and 4, are arranged in a plane A, whereas the rotor 1 rotates in a plane B parallel thereto. Each stator part 3 and 4, respectively, possess two main poles 7 in the form of fingers which taper toward the rotor axle and triangular-shaped auxiliary poles 8 formed thereon. The points of the auxiliary poles point counter to the direction of rotation of the rotor. The free ends of the main poles 7 support on a bearing block 9. The rotor shaft 10 is rotatably mounted in this bearing block 9 in a bore therein, preferably between two radially inwardly narrowed portions at the ends thereof forming circumferential tangential circles of a diameter substantially equal to that of the rotor shaft 10. The stator parts 3 and 4 each form an integral unit, respectively, with the main poles 7 and the auxiliary poles 8 which are associated therewith. Both units as well as the bridge part 5 are produced by stamping out or punching out from a Hyperm-766 sheet or sheet metal.

The rotor 1 is made of a plastic or synthetic material bonded permanent magnet disc 11, with which a samarium-cobalt alloy is used as the magnetic material. On its front surface facing away from the stator 2 there is mounted a return disc 12 made of a soft magnetic material (or low rententive material) of low coercive force or retentivity. For the return disc 12, for example, the previously mentioned Hyperm can be used. Both discs 11 and 12 are forced or pressed on the rotor axle or shaft 10. The permanent magnetic disc 11, is axially magnetized, that means a south pole on one face side of the rotor stands opposite a north pole on the other face side of the rotor.

Referring now again to the drawings, the single phase stepping motor illustrated in FIG. 3 differs from the previous embodiment in the manner that with it only two main poles 7 are provided with auxiliary poles 8, whereas the other two main poles have no auxiliary poles. As may be seen by comparison of the drawings, in this manner the pole surfaces of the main poles may be formed larger, whereby an over-shooting or over-swinging of the rotor is damped stronger after each step than with the previously described embodiment. The motor starting torque however turns out somewhat more unfavorable.

For appreciation of the actual dimensions of such a type of motor which is laid out or rated for an operating voltage of less than or equal to 1.5 volts, the following attainable dimensions may be stated: length approximately 9 mm, width approximately 5 mm and height approximately 2.4 mm.

By the arrangement at least of one permanent magnet 16 between the stator poles, beyond this an unipolar controllable motor can be obtained. The permanent magnet thereby must be arranged such that it further rotates the rotor 1 into a rest position after the end of each excitation phase. By an unipolar control of the motor a further reduction of the current consumption may be achieved. Moreover protection against confusing of the poles is not required and can be done without, whereby a simplification in the control circuit of the motor is brought about.

Figure 4:
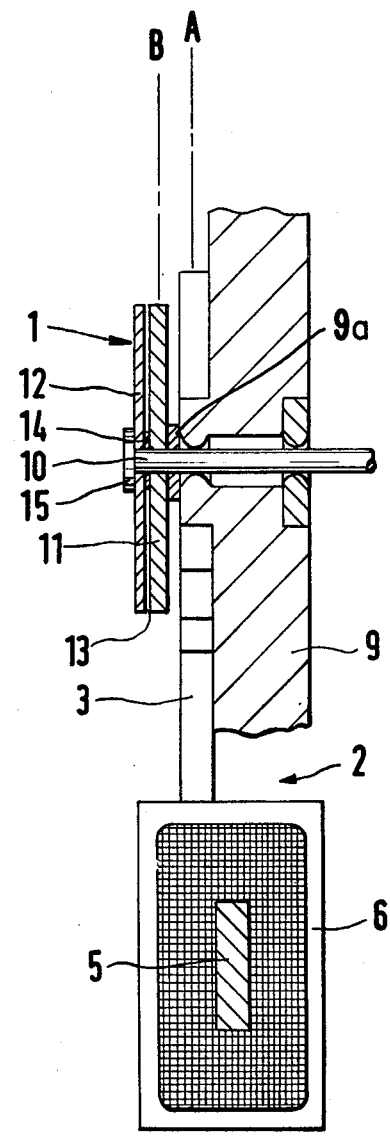
FIG. 4 is a longitudinal section through the single phase stepping motor with a return disc which is mounted floating.

FIG. 4 illustrates an embodiment which differs from that according to FIGS. 1 and 2 in the manner that the return disc 12 is mounted floating or overhanging on the shaft 10 between the permanent magnet disc 11 and a collar 15 of the shaft 10, whereby a ring 14 made of a paramagnetic or diamagnetic material is arranged between the return disc 12 and the permanent magnet 11, the ring 14 forming an air gap 13 between the return disc 12 and the permanent magnet 11.

If in particular cases an efficiency loss can be tolerated, thus the possibility exists to be able to further reduce the construction height of the motor in the manner that the application or installation of a return disc is completely unnecessary and can be eliminated. The magnetic return then takes place over the magnetic rotor.

The rotor 1 may abut the front side of a smaller bearing 9a disposed between the bearing 9 and the rotor disc 11, only the rear side of the bearing 9a rotating relative to the bearing 9, thereby reducing wear against the magnetic disc 11. The bearings 9 and 9a are made of a synthetic or plastic material.

In operation in the unexcited condition the rotor 1 is located in a rest position. In this position the magnetic resistance of the magnetic circuit is the smallest. The magnetic poles N and S, respectively, of the magnetic disc 11 are then located in a maximized position over the stator poles 7.

With an excited stator 2 the rotor 1 is rotated clockwise as viewed in the drawings by action of the auxiliary poles 8 into a new position in which the main poles 7 of the stator lie maximized relative to or between the magnetic disc poles (e.g. note FIG. 1). Now the auxiliary poles 8 project into the range of the magnetic poles N, S of the magnetic disc 11 of the rotor 1. As soon as the excitation of the stator is terminated, the rotor 1 is rotated further clockwise by the auxiliary poles 8 and the magnetic poles into the next rest position. In operation pulses are fed to the excitation coil 6 causing the rotor of the single phase stepping motor to undergo its stepwise movement.

While there has been disclosed several embodiments of the present invention, it is to be understood that these embodiments are given by example only and not in a limiting sense.

I claim:

1. A single phase stepping motor, particularly for clocks, comprising
   a rotor having a rotor shaft and an axially magnetized permanent magnet disc with at least six rotor poles of alternating polarity in an equidistant arrangement, said disc being arranged on said shaft,
   a bridge part,
   an excitation winding carried on said bridge part constituting means for being pulsewise excited,
   a stator being made of two spaced apart stator parts exclusively connected with one another by said bridge part,
   each of said stator parts transfers on its free end into at least two finger-like stator poles being directed overlappingly facing one face side of said permanent magnet disc and said stator poles being magnetically separated one from the other by and defining a recess therebetween,
   the number of said stator poles being small in comparison to half the number of rotor poles,
   at least some of said stator poles respectively including a main pole and an auxiliary pole, at least a portion of said main pole has said auxiliary pole thereon, each said auxiliary pole projects into said recess,
   said stator parts being disposed in a first plane at least in a region of said stator poles,
   said permanent magnet disc being disposed in a second plane, near and parallel to said first plane, and
   a return disc being disposed on a face side of said permanent magnet disc, said face side facing away from said stator poles, whereby upon excitation of said excitation winding said rotor is rotated in a direction opposite to the projecting direction of said auxiliary poles into a new position where the main poles of said stator lie maximized relative to the rotor poles with the auxiliary poles projecting into a range of said rotor poles, and after the end of each excitation the rotor is further rotated in the same direction by cooperation of said auxiliary poles and said rotor poles into a rest position where the rotor poles are located in a maximized position over said stator poles whereby the magnetic resistance of all said poles is minimized.

2. The single phase stepping motor as set forth in claim 1, wherein
   each of said stator parts with said main poles and said auxiliary poles coordinated thereto form an integral unit made of sheet metal.

3. The single phase stepping motor as set forth in claim 1, wherein
   each of said main poles comprises a finger tapering toward said rotor shaft.

4. The single phase stepping motor as set forth in claim 1, wherein
   each of said auxiliary poles comprises a triangular shaped part, said triangular shaped part is formed on a substantially radially directed lengthwise edge of said main pole.

5. The single phase stepping motor as set forth in claim 1, wherein
   each of said main poles has a free end,
   a bearing means for rotatably mounting said rotor shaft,
   said free ends of said main poles are cooperatively formed to seat said bearing means.

6. The single phase stepping motor as set forth in claim 1, wherein
   said stator parts are made of a soft magnetic material of low retentivity.

7. The single phase stepping motor as set forth in claim 1, wherein
   said rotor is made of a synthetic material bonded permanent magnet made of a lanthanide-ferromagnetic alloy.

8. The single phase stepping motor as set forth in claim 7, further comprising
   a lanthanide-cobalt alloy constitutes material of the permanent magnet.

9. The single phase stepping motor as set forth in claim 8, wherein
   said material is a samarium-cobalt alloy.

10. The single phase stepping motor as set forth in claim 1, wherein
    said rotor is formed with 60 poles and said stator is formed with 30 poles.

11. The single phase stepping motor as set forth in claim 1, wherein
    said rotor is formed with 60 poles and said stator is formed with 10 poles.

12. The single phase stepping motor as set forth in claim 1, further comprising
    at least one permanent magnet means is arranged non-contactingly spaced between two of said stator poles in said recess therebetween for further rotating said rotor after the end of each excitation.

13. The single phase stepping motor as set forth in claim 1, wherein
    said return disc is mounted floating on said rotor shaft.

14. The single phase stepping motor as set forth in claim 13, further comprising
    means for providing a narrow air gap between said rotor and said return disc.

15. The single phase stepping motor as set forth in claim 14, further comprising
    a ring made of a paramagnetic or diamagnetic material, respectively, disposed between said rotor and said return disc.

* * * * *